United States Patent Office 3,078,346
Patented Feb. 19, 1963

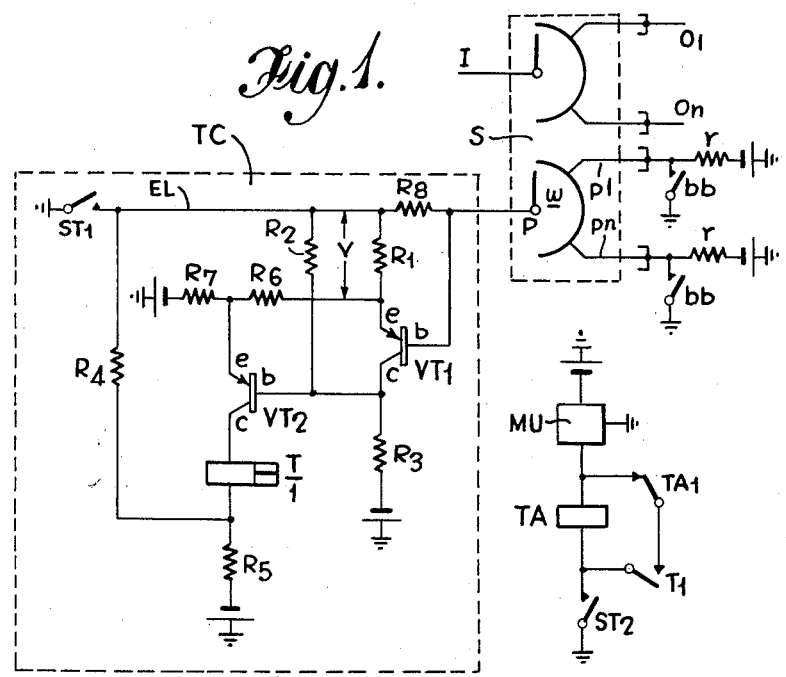
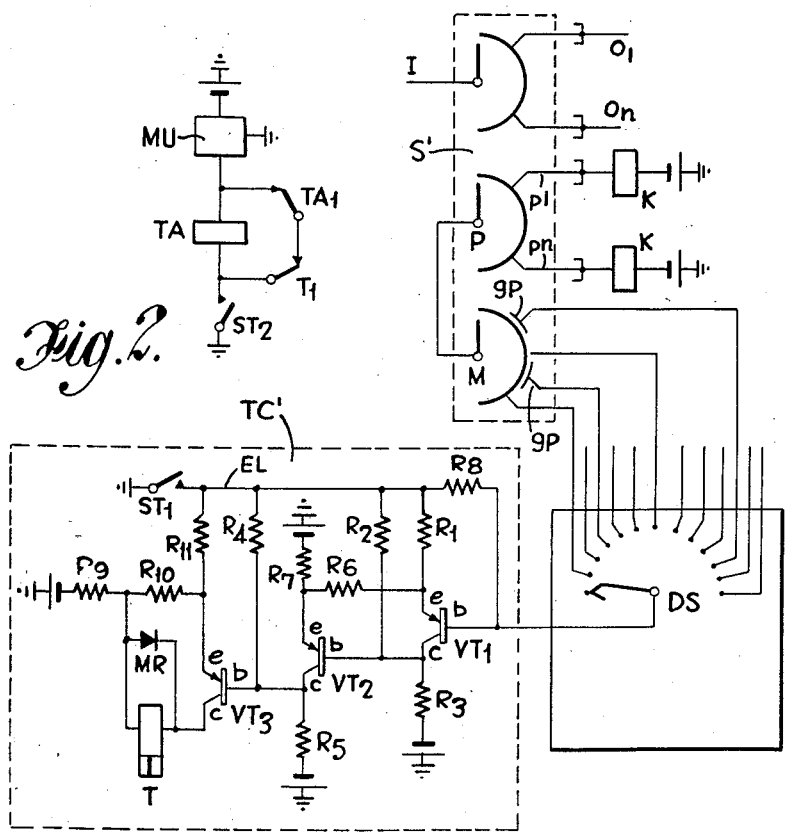

3,078,346
POTENTIAL TESTING CIRCUITS
John Conrad Cartwright, Bromley, Kent, and Donald Keith Hicks, Dartford, Kent, England, assignors to Associated Electrical Industries (Woolwich) Limited, London, England, a British company
Filed June 19, 1959, Ser. No. 821,470
Claims priority, application Great Britain July 4, 1958
6 Claims. (Cl. 179—18)

This invention relates broadly to what may conveniently be called potential testing circuits which, being connected to a test point whose potential is determined according as to whether or not the circuit is required to fulfil a particular function, become effective to fulfil said function in response only to test point potentials of appropriate value.

The invention has an important application in providing a testing circuit suitable for use in a telephone or other selector system of the kind in which, as a selector scans each of a number of channels in turn, so each of a corresponding number of testing terminals of the selector, each held at a potential within a given range of values when its appertaining channel is free and at a potential outside this range when the channel is busy, are synchronously connected in turn to a point, constituting a test point as above referred to, at which the appearance of a potential corresponding to a free condition of a channel then reached by the selector causes a potential testing circuit to respond and on so responding to stop the selector at, and seize, that channel. The testing terminals may for instance be the bank contacts of a so-called P-arc of the selector, the test point being the wiper associated with that arc.

It is an object of the invention to provide a potential testing circuit which, when used in a selector system of the kind just set forth, can fulfil the required functions and on responding to a test point potential corresponding to a free channel condition, can also change to a busy value the potential of the test point and thus of the testing terminal for the channel at which the selector is stopped. In this latter connection it will be appreciated that where, as is common in automatic telephone exchanges, two or more selectors having their testing terminals multipled together can scan the same group of channels simultaneously, it is highly desirable that the potential of the multipled testing terminals relating to a seized channel shall be changed to the busy value with a minimum of delay following seizure of the channel by one of the selectors in order to prevent another selector from seizing the same channel.

A potential testing circuit conforming to the invention employs a pair of transistors coupled together to form a trigger circuit which, in response to a test point potential within a certain range of values, can change by a trigger action from an initial, untriggered, state in which one of the transistors is relatively heavily conductive as compared with the other, to the opposite, triggered, state in which this other transistor is relatively heavily conductive and a high-speed relay is caused to become effective, either by being released or operated, to fulfil whatever function may be required (for instance the stopping of a selector), the circuit also including a resistance which in the triggered state of the circuit is effective by virtue of a potential difference then established across is, to maintain the test point at a potential outside of said range of values.

In carrying out the invention the two transistors may be coupled together to form the trigger circuit by providing them with a common emitter resistance and respective collector resistances and coupling the collector of the first transistor to the base of the second, the base of the first transistor being connected to the test point and the relay being connected to be controlled directly or indirectly in dependence on current flow in the collector circuit of the second transistor. With the second transistor conductive in the initial state of the circuit the potential drop across the common emitter impedance would then effectively bias the first transistor towards non-conduction. If, however, the test point assumes a potential such as to overcome this bias and tend to make the first transistor conductive, the resulting regenerative action of the feedback loop, as constituted by the coupling between the collector of the first transistor and the base of the second in conjunction with the common emitter resistance, produces a rapid transition of the circuit to the opposite state in which the first transistor is conductive and the second tends towards non-conduction so that the relay becomes released to fulfil its function. Furthermore by arranging that in this opposite state the potential difference across the common emitter resistance is less than in the initial state, this smaller potential difference is effective, through the emitter-base diode of the now conductive first transistor, to hold the test point at a potential which is less than that which was required to trigger the circuit, that is, to initiate the rapid transition thereof, from its initial state to the opposite state.

In order that the invention, and the mode of use and operation of a testing circuit in accordance therewith, may be more readily understood, particular embodiments and applications thereof will now be described with reference to the accompanying drawings in which:

FIG. 1 illustrates a basic form of potential testing circuit in accordance with the invention, associated with a selector which it controls, and FIG. 2 illustrates a modified form of the potential testing circuit, associated by way of example with a different selector arrangement.

Referring to FIG. 1, S conventionally represents a selector which, in general, affords access over a contact bank thereof between an incoming connection I and a free one of a number of outgoing connections $O_1 \ldots O_n$. The selector S, assumed to be a motor uni-selector the latch magnet of which is represented at MU, also has a bank P of testing terminals to which are connected wires $p_1 \ldots p_n$ which correspond respectively to the outgoing connections $O_1 \ldots O_n$. An outgoing connection that is busy has its corresponding p-wire held at earth potential by closure of a contact $bb$, while the p-wire corresponding to a free outgoing connection is held at a negative battery potential over a resistance or other impedance $r$. The wiper $w$ of the testing bank P, which scans the p-wires in turn as the selector S searches for a free outgoing connection $O_1 \ldots O_n$, corresponds to the test point already referred to. The outgoing connections $O_1 \ldots O_n$ and their p-wires, are assumed to be multipled over corresponding contact banks of a plurality of other selectors in the manner usual in automatic telephone exchanges.

For testing the potentials of the p-wires and for stopping the selector S at an outgoing connection which the tested p-wire potential indicates as being free, the wiper $w$ of the testing bank P is connected to a testing circuit TC.

In accordance with the present invention, this testing circuit TC comprises two transistors VT1 and VT2 which are coupled together to form a two-state trigger circuit, and also includes a resistance R1 which, in the triggered state of the circuit, has the effect of maintaining the test point, that is, the wiper $w$, at a potential which is sufficiently close to earth potential to impart a busy condition to the p-wire with which the wiper $w$ is then in engagement.

In more detail, the two transistors VT1 and VT2 of the trigger testing circuit TC have their collectors ($c$) connected to respective potential dividing resistance chains R2, R3 and R4, R5 each connected between a negative battery and an earth line EL which is connected to earth only when a start contact ST1 is actuated at the beginning of a search by the selector S. The collector of transistor VT1 is also connected directly to the base (*b*) of transistor VT2, and the connection of the collector of this latter transistor to its potential divider R4, R5 includes the operating winding of a high-speed relay T. The emitter (*e*) of the transistor VT1 is connected to the earth line EL through resistor R1, while the emitter of the transistor VT2 is connected to the earth line through a resistor R6 in series with resistor R1. This resistor R1 therefore constitutes a common emitter resistor for the two transistors. The emitter of the second transistor VT2 is also connected to negative battery through a bias resistor R7 of relatively high value compared with the resistors R1 and R6. The base (*b*) of the transistor VT1 is connected on the one hand to the wiper *w* and on the other hand through a further resistor R8 to the earth line EL.

The latch magnet MU of the motor uniselector S is connected in an energising circuit in series with another start contact ST2 and the operating winding of a relief relay TA, this latter relay winding being shunted by a series circuit including a make contact T1 of the high speed relay T and a break contact TA1 of the relief relay TA.

The operation is as follows. On closing the start contacts ST1 and ST2, the earth line EL is connected to earth by contact ST1. The transistor VT2 thereupon conducts, and transistor VT1 is cut off by reason of the fact that its emitter is held negative with respect to its base by the voltage drop then produced across the common emitter resistor R1 by the collector-emitter current of the transistor VT2. This latter current also operates the high speed relay T, which by closing its contact T1 establishes a short circuit across the relief relay TA, which is thereby prevented from operating consequent on the closure of the start contact ST2. The latch magnet M becomes energised, however, and the uniselector S therefore begins to drive.

The earth, or near earth, potential at which the p-wires are held when their corresponding outgoing connections O₁ ... Oₙ are busy, is positive with respect to the potential which is imparted to the emitter of the transistor VT1 by the potential difference V developed across the common resistor R1 in the normal, untriggered, state (VT2 conducting) of the circuit TC. Consequently the testing circuit does not respond to that p-wire potential and the selector passes on. At an outgoing connection which is free, however, the potential of the p-wire corresponding to that connection is that of its negative battery and current therefore flows from this battery through the resistor *r*, the p-wire, the wiper *w* and the resistor R8 via contact ST1 to earth. When the voltage across the resistor R8 rises above that across the common resistor R1, current will begin to flow out of the base of the transistor VT1. When this base current has reached a certain small value, amplified current will flow in the collector circuit of the transistor VT1 to produce at its collector, because of the presence of resistor R3, a voltage drop which begins to cut off the transistor VT2. The parameters of the circuit components are chosen not only so that under this amplification condition the gain round the feed-back loop exceeds unity, but also so that the current passed by the transistor VT2 in the untriggered state of the circuit exceeds that passed by the transistor VT1 after transition of the circuit to its opposite state. Consequently the voltage across the common resistor R1 becomes smaller, and this in turn results in a larger base-emitter voltage on the transistor VT1, causing further increase in its collector current. Consequently the circuit will change over almost instantaneously, for example in the region of a microsecond, to its opposite state in which the transistor VT1 is conducting and the transistor VT2 is cut off.

Immediately following this trigger action, the collector current of the transistor VT1 will be small and the voltage across the common resistor R1 will have become nearly zero. The potential on the base of the transistor VT1, and therefore the potential at the wiper *w* and on the p-wire of the outgoing connection which the selector S has then reached, will therefore also be low because of the low internal voltage drop between the base and emitter of the transistor. Since this last potential is significantly less than that to which similar testing circuits associated with the other selectors of the multiple can respond, substantially instantaneous busying of that particular outgoing connection is achieved.

The cut-off of the transistor VT2 results in the rapid release of the high speed relay T to open its make contact T1. The relief relay TA then operates in series with the selector latch magnet MU and opens its break contact TA1 so that it cannot be released by short circuit on subsequent re-operation of relay T. The latch magnet MU releases to cut the drive of the motor uniselector S and engage the latch in the gear wheel. The selector is thus stopped at, and seizes, the particular, free, outgoing connection which it has reached. Thus the only delay between detection of a free condition of an outgoing connection and the release of the latch magnet MU will be the very short triggering time of the regenerative action in the circuit TC plus the release lag of the high speed relay T. This delay can be designed to be well below the maximum which is permissible for accurate dropping of the latch into the gear wheel of the motor uniselector S.

When the current in the base of the transistor VT1, which has been rising, reaches a maximum value, the voltage across the common resistor R1 will become fixed at a value which is significantly less than the value which existed across it in the initial, untriggered, state of the circuit. Thus at any time after the initial triggering, the voltage on the base of the transistor VT1 will remain lower in magnitude than the last-mentioned value and the seized outgoing connection is therefore effectively marked busy. In due course a full earth is applied to the p-wire of the seized outgoing connection by closure of the relevant contact *bb*. As a result, this earth potential is applied to the base of transistor VT1 over wiper *w*, and the testing circuit TC thereupon reverts to its untriggered condition. If desired, the testing circuit TC can then be released so that it can be made available to other selectors. The opening of the start contact ST1 in the testing circuit TC restores the circuit to its de-energised condition, in which condition it will take no current and the relay T is released: the opening of the contacts ST2 releases the relay TA.

An advantage of the regenerative action of the trigger testing circuit TC is that the transition time of the transistors under all circumstances is very short. Consequently, use can be made both of the maximum voltage specified for the transistors VT1 and VT2 in their cut-off state and of the maximum specified current in their conductive state. The design can be such that in either of these states there will be only a small dissipation at each collector. When either transistor is cut off there will only be a very small leakage current flowing in it, whereas when either transistor is conductive it can be "bottomed" and there will be only a very small collector-emitter voltage drop. The power dissipated will rise to a peak during the transition and the value of this peak will be governed by the values of the current and voltage mentioned above. Since, however, the transition time is very short the maximum specified power can be exceeded without harm to the transistor.

The values of the resistors R2, R3 and R4, R5 constituting the potential divider chains for the collectors of the transistors VT1 and VT2 are so chosen as to ensure that collector-emitter potentials of the two transistors in their cut-off states are lower than the values permitted for these potentials having regard to the maximum ambient temperatures and to the condition of the respective base-emitter paths. The value of the resistor R8 connected to the base of the transistor VT1 is chosen such as to ensure that the voltage across the common resistor R1 provides a reverse bias for the transistor VT1 in its cut-off condition, so that its leakage current at maximum temperature is not excessive. Similarly the potential divider constituted by the resistors R7 and R6 introduces across this latter resistor a reverse bias for the transistor VT2 in its cut-off condition. By designing the circuit in this way thermal stability of the transistors can be obtained. Purely by way of example, suitable resistance values, assuming a 50 volt battery, could be $R1=20$ ohms, $R2=1$ kilohm, $R3=5$ kilohms, $R4=82$ ohms, $R5=210$ ohms, $R6=20$ ohms, $R7=5$ kilohms and $R8=10$ kilohms.

Since the re-operating time of the high speed relay T is short, the selector S will not be stopped unless a "free" p-wire potential is applied to the circuit by the wiper $w$ for a time longer than the operating lag of the relief relay TA. In this way it is possible to prevent the selector from falsely seizing a busy outgoing connection if the preceding outgoing connection should become free late in the travel of the selector wipers over the bank terminals corresponding to this preceding connection.

As has been stated, FIG. 1 relates to a general case of the application of the invention. Thus, for example, the selector S could represent, with appropriate self-evident modifications, a marker-controlled final selector in an automatic telephone exchange, or a line finder or a group selector.

In the case of a final selector, the outgoing connections $O_1 \ldots O_n$ could represent subscribers' lines and the impedances $r$ in the p-wires could represent the operating windings of the usual line cut-off relays: a control circuit, which may be a common control circuit including the testing circuit TC, would in known manner mark the P-wire of the wanted line and the testing circuit would operate to stop the selector at that line in response to its p-wire having a negative potential which indicates that the line is free. In known final selector testing circuits including a high speed relay as a marginal operate testing device, it has usually been necessary to shunt the inductance of the line cut-off relays by non-inductive resistances. These resistances have generally had to be of close tolerance to meet the marginal discrimination requirements, and of large wattage rating to obviate fire risks. Generally also, each line cut-off relay has had to be provided with a contact which removes the resistive shunt as soon as the line to which it relates has been seized in order to save undue battery drain. By using the testing circuit of the invention it becomes unnecessary to use these shunt resistors with a consequent avoidance of the disadvantages introduced thereby.

In the case of line finders, an arrangement can be used which is basically similar to FIG. 1 but in which, again in known manner, the p-wire of any line is connected to the testing arc P of the selector, and thereby presented for testing by the testing circuit TC, only when the line is calling. The testing circuit in this case will be non-responsive not only to a busy earth condition of a p-wire, but also to an open-circuit, not-calling condition.

In the case of a group selector, the circuit parameters would need to be chosen so that the testing circuit would be responsive to a free condition presented by a battery and a low resistance but would be non-responsive to a release condition presented by a battery via a number of holding relays connected in parallel and having an effective combined resistance considerably exceeding the low resistance just mentioned.

Considering again the circuit TC in FIG. 1, when the transistor VT2 cuts off the current in the high speed relay T, a large surge will tend to be developed across the emitter-collector of this transistor due to the sudden release of the energy stored in the relay coil. However, the reverse biased collector-base junction of the transistor VT2 has a turnover voltage which exceeds the equilibrium potential in the cut-off state by a considerable margin, this turnover being due to an avalanche effect and, as in a Zener diode, having a voltage limiting action. Due to the above-mentioned margin no significant delay is introduced and the relay T consequently responds within the desired duration. However, under more adverse conditions, for example with a coil of higher energy, it may be necessary to introduce a limiting device such as a rectifier to prevent damage to the transistor. Since the connection of a rectifier across the relay coil would considerably increase the release lag of the relay, it is contemplated that when introducing such a limiting device an inverting stage may be required between the transistor VT2 and the relay T in order to keep the overall response time short. The presence of this additional stage, by reason of its inverting action, would make the overall response time dependent on the operating lag of the relay rather than on its release lag: the operating lag would be substantially unaffected by the presence of a rectifier.

A testing circuit modified in the manner just indicated is illustrated in FIG. 2 in which those elements of the testing circuit TC' which have counterparts in the circuit TC of FIG. 1 have been given the same references as in this latter figure. In FIG. 2, the transistors VT1 and VT2 and the resistors R1 to R8 associated with them are interconnected in exactly the same manner as FIG. 1 except that the high speed relay T is no longer included in the collector circuit of transistor VT2. Instead, the collector of transistor VT2 is connected to the base of a third transistor VT3, which has its collector connected through the relay T to the junction of resistors R9 and R10 in a potential dividing resistance chain R9, R10, R11, connected between battery and the earth line EL. The emitter of transistor VT3 is also connected to this resistor chain at the junction of resistors R10 and R11. For the reason already given, the operating coil of relay T is shunted by a rectifier MR. In this instance, the conduction of transistor VT2 following closure of the start contact ST1 results in the base of transistor VT3 being held positive with respect to its base. Therefore in this untriggered state of the testing circuit TC', transistor VT3 is non-conductive and relay T is not energised. This inversion relatively to FIG. 1 requires that the contact T1 in the energising circuit for the selector latch magnet MU must this time be a break contact rather than a make contact as in FIG. 1. The trigger action of the testing circuit, initiated by the negative potential applied to it from the p-wire of a free outgoing connection reached by the selector, is the same as already described. When the transistor VT2 becomes non-conductive, the base of transistor VT3 is brought negative with respect to its emitter and this latter transistor therefore conducts, operating relay T. This stops the selector by opening at T1 the short circuit round relay TA, thereby putting this relay in series with the latch magnet MU as before.

The considerations governing the choice of values for resistors R1 to R8 are the same as already considered with regard to FIG. 1. The resistors R9, R10 and R11 are so chosen that when no collector current is flowing in transistor VT3, it is given a reverse bias to ensure thermal stability.

FIG. 2 also illustrates the application of the testing circuit in association with a selector S' which in known manner has the wiper $w$ of its testing bank P coupled to the wiper of a marking bank M the terminals of which are connected over marking leads $m$ to a digit switch or other selector DS. The selector DS is positioned in accordance with the number of impulses received in accordance with a dialled digit or digits. If S' represents a final selector giving access to ordinary subscribers' lines as well as to P.B.X lines, the selector DS would be set according to the last two digits of a dialled number: on the other hand if S' represents a group selector giving access to selectors in a subsequent rank, or a final selector giving access exclusively to large P.B.X groups of lines (that is, P.B.X groups having at least ten lines but possibly having up to a hundred), the selector DS may be set in accordance with only a single digit. The manner in which the setting of the selector DS is achieved need not be described here because it is known art and forms no part of the invention.

The outlets of selector DS are connected over the marking leads *m* to the terminals of bank M of selector S'. In the case of ordinary subscribers' lines on a final selector, the leads *m* go to individual terminals of bank M corresponding to the respective subscribers' lines: in the case of P.B.X groups of lines, or of selector groups to which the selector S' gives access as a group selector, the M bank terminals corresponding to a group are connected together, as represented at *gp*, and to a single marking lead *m* from the selector DS. Once the selector DS has been set according to a wanted line or group, the selector S' is driven round until the wanted line or group is reached. In the case of a wanted line, its p-wire is then extended over the wiper *w*, the marking bank M, the relevant marking lead *m* and the selector DS to the testing circuit TC', which responds and stops the selector if the p-wire of the wanted line has the negative potential which indicates that the line is free. In the case of a wanted group, the p-wires relating to the group are extended in turn, as the selector scans the group, over the wiper *w*, the marking bank M, the marking lead *m* connected to the relevant group of marking bank terminals, and the selector DS to the circuit TC', which responds and stops the selector S' when a free line or selector of the group is reached.

In FIG. 2 the selector S' has been assumed for the purposes of illustration to be a final selector serving ordinary and P.B.X lines, the p-wires of these lines having been shown as including the operating coils of line cut-off relays K.

The use of the testing circuit of the invention in conjunction with final selectors serving P.B.X groups of lines is particularly advantageous in that it enables P.B.X groups of up to as many as a hundred lines to be searched over by a motor-uniselector final selector in a single rapid sweep, thus ensuring minimum connection time together with low wear and maintenance costs. Furthermore the use of the testing circuit of the invention in association especially with motor-uniselector final selectors and line finders can make it possible to control such final selectors and line finders in conjunction with ratchet drive switches included in the same or different ranks of an exchange.

What we claim is:

1. A potential testing circuit responsive to a test point potential within a certain range of values, comprising first and second transistors, a common emitter resistance for said transistors, a collector resistance for at least said first transistor, a collector-to-base connection from said first transistor to the second transistor, said transistors and resistances together forming a trigger circuit having an untriggered state in which one of the transistors is relatively heavily conductive compared with the other transistor and a triggered state in which this latter transistor is the more heavily conductive but produces across the common emitter resistance a lesser potential difference than is produced across it in the untriggered state, a base connection from the first transistor to the test point whereby the trigger circuit will be triggered from its untriggered state in response to a test point potential within said range of values, and a high-speed relay connected to be operated in one state of the trigger circuit, the lesser potential difference produced across the common emitter resistance in the triggered state of the trigger circuit acting through the emitter-base diode of the first transistor to hold the test point at a potential outside said range of values.

2. A potential testing circuit as claimed in claim 1 wherein the relay has an operating coil connected in the collector circuit of the second transistor.

3. A potential testing circuit as claimed in claim 1 including an inverting stage comprising a third transistor having an operating coil of the relay connected in its collector circuit, and a base connection to the collector of the second transistor, said second transistor also having a collector resistance.

4. A potential testing circuit as claimed in claim 3, including a limiting device such as a rectifier connected to protect the third transistor from voltage surges generated by the relay coil on de-energisation thereof.

5. A potential testing circuit as claimed in claim 1 provided in conjunction with a uniselector having at least two contact banks one of which is a bank of test contacts each arranged to have a potential dependent on the busy or free condition of a corresponding contact in the other said bank, a wiper associated with the test bank constituting said test point and the trigger circuit being triggerable from its untriggered state in response to a "free" potential appearing on said wiper from one of the test contacts.

6. A potential testing circuit as claimed in claim 1 provided in conjunction with a uniselector having at least three contact banks of which one is a bank of test contacts each arranged to have a potential dependent on the busy or free condition of a corresponding contact in another bank and the third bank is a bank of marking contacts which are selectively connectible to the test point otherwise than by this selector, said marking and test contact banks having respective associated wipers interconnected with each other.

References Cited in the file of this patent

UNITED STATES PATENTS

| | | |
|---|---|---|
| 2,581,457 | Theillaumas | Jan. 8, 1952 |
| 2,662,119 | Buchner | Dec. 8, 1953 |
| 2,682,019 | Molnar | June 22, 1954 |

UNITED STATES PATENT OFFICE

CERTIFICATE OF CORRECTION

Patent No. 3,078,346                      February 19, 1963

John Conrad Cartwright et al.

It is hereby certified that error appears in the above numbered patent requiring correction and that the said Letters Patent should read as corrected below.

In the grant, lines 3 and 13, and in the heading to the printed specification, lines 4 and 5, for "Associated Electrica Industries (Woolrich) Limited" read -- Associated Electrical Industries (Woolwich) Limited --.

Signed and sealed this 10th day of September 1963.

(SEAL)
Attest:

ERNEST W. SWIDER
Attesting Officer

DAVID L. LADD
Commissioner of Patents